US012746467B2

(12) United States Patent
Myers et al.

(10) Patent No.: US 12,746,467 B2
(45) Date of Patent: Sep. 29, 2026

(54) SYSTEMS AND METHODS FOR DYNAMICALLY, AUTOMATICALLY GENERATING AND/OR FILTERING SHADOW MAPS IN A VIDEO GAME

(71) Applicant: Activision Publishing, Inc., Santa Monica, CA (US)

(72) Inventors: Kevin Andrew De Zeng Myers, Santa Cruz, CA (US); Michael Jonathan Uhlik, Austin, TX (US)

(73) Assignee: Activision Publishing, Inc., Santa Monica, CA (US)

( * ) Notice: Subject to any disclaimer, the term of this patent is extended or adjusted under 35 U.S.C. 154(b) by 692 days.

(21) Appl. No.: 18/053,100

(22) Filed: Nov. 7, 2022

(65) Prior Publication Data

US 2023/0149811 A1 May 18, 2023

Related U.S. Application Data

(60) Provisional application No. 63/264,030, filed on Nov. 12, 2021.

(51) Int. Cl.

*A63F 13/52* (2014.01)
*G06T 15/60* (2006.01)

(52) U.S. Cl.

CPC .............. *A63F 13/52* (2014.09); *G06T 15/60* (2013.01)

(58) Field of Classification Search

CPC .. A63F 13/52; A63F 2300/6646; G06T 15/60; G06T 2210/36; G06T 2215/12
See application file for complete search history.

(56) References Cited

U.S. PATENT DOCUMENTS

| | | | |
|---|---|---|---|
| 5,530,796 | A | 6/1996 | Wang |
| 5,561,736 | A | 10/1996 | Moore |
| 5,563,946 | A | 10/1996 | Cooper |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Fernando Randima et al., Adaptive Shadow Maps, 2001 (Year: 2001).*

(Continued)

*Primary Examiner* — Jay Trent Liddle
*Assistant Examiner* — Jose Angeles
(74) *Attorney, Agent, or Firm* — Novel IP

(57) ABSTRACT

The present specification describes systems and methods for dynamically modulating a resolution of shadows corresponding to lights in a frame of a video game scene. The shadows are generated by a module executed at least in part on a player's computing device in data communication with at least one host computer. A memory budget, also referred to as an allocated memory, is first defined. A size of each of the shadow maps corresponding to the lights is determined. An overall size of the shadow maps is also determined, along with a composite scaling factor for each of the lights. The composite scaling factor is applied across each of the shadows maps if the overall size exceeds a predefined threshold percentage of the memory budget.

18 Claims, 5 Drawing Sheets

(56) References Cited

U.S. PATENT DOCUMENTS 5,685,775 A 11/1997 Bakoglu
5,706,507 A 1/1998 Schloss
5,708,764 A 1/1998 Borrel
5,736,985 A 4/1998 Lection
5,737,416 A 4/1998 Cooper
5,745,678 A 4/1998 Herzberg
5,768,511 A 6/1998 Galvin
5,825,877 A 10/1998 Dan
5,835,692 A 11/1998 Cragun
5,878,233 A 3/1999 Schloss
5,883,628 A 3/1999 Mullaly
5,900,879 A 5/1999 Berry
5,903,266 A 5/1999 Berstis
5,903,271 A 5/1999 Bardon
5,911,045 A 6/1999 Leyba
5,920,325 A 7/1999 Morgan
5,923,324 A 7/1999 Berry
5,969,724 A 10/1999 Berry
5,977,979 A 11/1999 Clough
5,990,888 A 11/1999 Blades
6,014,145 A 1/2000 Bardon
6,025,839 A 2/2000 Schell
6,059,842 A 5/2000 Dumarot
6,069,632 A 5/2000 Mullaly
6,081,270 A 6/2000 Berry
6,081,271 A 6/2000 Bardon
6,091,410 A 7/2000 Lection
6,094,196 A 7/2000 Berry
6,098,056 A 8/2000 Rusnak
6,104,406 A 8/2000 Berry
6,111,581 A 8/2000 Berry
6,134,588 A 10/2000 Guenthner
6,144,381 A 11/2000 Lection
6,148,328 A 11/2000 Cuomo
6,185,614 B1 2/2001 Cuomo
6,201,881 B1 3/2001 Masuda
6,222,551 B1 4/2001 Schneider
6,271,842 B1 8/2001 Bardon
6,271,843 B1 8/2001 Lection
6,282,547 B1 8/2001 Hirsch
6,311,206 B1 10/2001 Malkin
6,334,141 B1 12/2001 Varma
6,336,134 B1 1/2002 Varma
6,337,700 B1 1/2002 Kinoe
6,353,449 B1 3/2002 Gregg
6,356,297 B1 3/2002 Cheng
6,411,312 B1 6/2002 Sheppard
6,426,757 B1 7/2002 Smith
6,445,389 B1 9/2002 Bossen
6,452,593 B1 9/2002 Challener
6,462,760 B1 10/2002 Cox, Jr.
6,469,712 B1 10/2002 Hilpert, Jr.
6,473,085 B1 10/2002 Brock
6,499,053 B1 12/2002 Marquette
6,505,208 B1 1/2003 Kanevsky
6,525,731 B1 2/2003 Suits
6,549,933 B1 4/2003 Barrett
6,567,109 B1 5/2003 Todd
6,618,751 B1 9/2003 Challenger
RE38,375 E 12/2003 Herzberg
6,657,617 B2 12/2003 Paolini
6,657,642 B1 12/2003 Bardon
6,664,962 B1 * 12/2003 Komsthoeft ............ G06T 15/60
345/589
6,684,255 B1 1/2004 Martin
6,717,600 B2 4/2004 Dutta
6,734,884 B1 5/2004 Berry
6,765,596 B2 7/2004 Lection
6,781,607 B1 8/2004 Benham
6,819,669 B2 11/2004 Rooney
6,832,239 B1 12/2004 Kraft
6,836,480 B2 12/2004 Basso
6,886,026 B1 4/2005 Hanson
6,948,168 B1 9/2005 Kuprionas
RE38,865 E 11/2005 Dumarot
6,993,596 B2 1/2006 Hinton
7,028,296 B2 4/2006 Irfan
7,062,533 B2 6/2006 Brown
7,143,409 B2 11/2006 Herrero
7,209,137 B2 4/2007 Brokenshire
7,230,616 B2 6/2007 Taubin
7,249,123 B2 7/2007 Elder
7,263,511 B2 8/2007 Bodin
7,287,053 B2 10/2007 Bodin
7,305,438 B2 12/2007 Christensen
7,308,476 B2 12/2007 Mannaru
7,404,149 B2 7/2008 Fox
7,426,538 B2 9/2008 Bodin
7,427,980 B1 9/2008 Partridge
7,428,588 B2 9/2008 Berstis
7,429,987 B2 9/2008 Leah
7,436,407 B2 10/2008 Doi
7,439,975 B2 10/2008 Hsu
7,443,393 B2 10/2008 Shen
7,447,996 B1 11/2008 Cox
7,467,181 B2 12/2008 McGowan
7,475,354 B2 1/2009 Guido
7,478,127 B2 1/2009 Creamer
7,484,012 B2 1/2009 Hinton
7,503,007 B2 3/2009 Goodman
7,506,264 B2 3/2009 Polan
7,515,136 B1 4/2009 Kanevsky
7,525,964 B2 4/2009 Astley
7,552,177 B2 6/2009 Kessen
7,565,650 B2 7/2009 Bhogal
7,571,224 B2 8/2009 Childress
7,571,389 B2 8/2009 Broussard
7,580,888 B2 8/2009 Ur
7,596,596 B2 9/2009 Chen
7,640,587 B2 12/2009 Fox
7,667,701 B2 2/2010 Leah
7,698,656 B2 4/2010 Srivastava
7,702,784 B2 4/2010 Berstis
7,714,867 B2 5/2010 Doi
7,719,532 B2 5/2010 Schardt
7,719,535 B2 5/2010 Tadokoro
7,734,691 B2 6/2010 Creamer
7,737,969 B2 6/2010 Shen
7,743,095 B2 6/2010 Goldberg
7,747,679 B2 6/2010 Galvin
7,765,478 B2 7/2010 Reed
7,768,514 B2 8/2010 Pagan
7,773,087 B2 8/2010 Fowler
7,774,407 B2 8/2010 Daly
7,782,318 B2 8/2010 Shearer
7,792,263 B2 9/2010 D Amora
7,792,801 B2 9/2010 Hamilton, II
7,796,128 B2 9/2010 Radzikowski
7,808,500 B2 10/2010 Shearer
7,814,152 B2 10/2010 McGowan
7,827,318 B2 11/2010 Hinton
7,843,471 B2 11/2010 Doan
7,844,663 B2 11/2010 Boutboul
7,847,799 B2 12/2010 Taubin
7,856,469 B2 12/2010 Chen
7,873,485 B2 1/2011 Castelli
7,882,222 B2 2/2011 Dolbier
7,882,243 B2 2/2011 Ivory
7,884,819 B2 2/2011 Kuesel
7,886,045 B2 2/2011 Bates
7,890,623 B2 2/2011 Bates
7,893,936 B2 2/2011 Shearer
7,904,829 B2 3/2011 Fox
7,921,128 B2 4/2011 Hamilton, II
7,940,265 B2 5/2011 Brown
7,945,620 B2 5/2011 Bou-Ghannam
7,945,802 B2 5/2011 Hamilton, II
7,970,837 B2 6/2011 Lyle
7,970,840 B2 6/2011 Cannon
7,985,138 B2 7/2011 Acharya
7,990,387 B2 8/2011 Hamilton, II
7,996,164 B2 8/2011 Hamilton, II
8,001,161 B2 8/2011 Finn
8,004,518 B2 8/2011 Fowler

(56) References Cited

U.S. PATENT DOCUMENTS

| | | | |
|---|---|---|---|
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |
| 8,184,116 | B2 | 5/2012 | Finn |
| 8,185,450 | B2 | 5/2012 | Mcvey |
| 8,185,829 | B2 | 5/2012 | Cannon |
| 8,187,067 | B2 | 5/2012 | Hamilton, II |
| 8,199,145 | B2 | 6/2012 | Hamilton, II |
| 8,203,561 | B2 | 6/2012 | Carter |
| 8,214,335 | B2 | 7/2012 | Hamilton, II |
| 8,214,433 | B2 | 7/2012 | Dawson |
| 8,214,750 | B2 | 7/2012 | Hamilton, II |
| 8,214,751 | B2 | 7/2012 | Dawson |
| 8,217,953 | B2 | 7/2012 | Comparan |
| 8,219,616 | B2 | 7/2012 | Dawson |
| 8,230,045 | B2 | 7/2012 | Kawachiya |
| 8,230,338 | B2 | 7/2012 | Dugan |
| 8,233,005 | B2 | 7/2012 | Finn |
| 8,234,234 | B2 | 7/2012 | Shearer |
| 8,234,579 | B2 | 7/2012 | Do |
| 8,239,775 | B2 | 8/2012 | Beverland |
| 8,241,131 | B2 | 8/2012 | Bhogal |
| 8,245,241 | B2 | 8/2012 | Hamilton, II |
| 8,245,283 | B2 | 8/2012 | Dawson |
| 8,265,253 | B2 | 9/2012 | D Amora |
| 8,310,497 | B2 | 11/2012 | Comparan |
| 8,334,871 | B2 | 12/2012 | Hamilton, II |
| 8,360,886 | B2 | 1/2013 | Karstens |
| 8,364,804 | B2 | 1/2013 | Childress |
| 8,425,326 | B2 | 4/2013 | Chudley |
| 8,442,946 | B2 | 5/2013 | Hamilton, II |
| 8,506,372 | B2 | 8/2013 | Chudley |
| 8,514,249 | B2 | 8/2013 | Hamilton, II |
| 8,554,841 | B2 | 10/2013 | Kurata |
| 8,607,142 | B2 | 12/2013 | Bergman |
| 8,607,356 | B2 | 12/2013 | Hamilton, II |
| 8,624,903 | B2 | 1/2014 | Hamilton, II |
| 8,626,836 | B2 | 1/2014 | Dawson |
| 8,692,835 | B2 | 4/2014 | Hamilton, II |
| 8,721,412 | B2 | 5/2014 | Chudley |
| 8,827,816 | B2 | 9/2014 | Bhogal |
| 8,838,640 | B2 | 9/2014 | Bates |
| 8,849,917 | B2 | 9/2014 | Dawson |
| 8,911,296 | B2 | 12/2014 | Chudley |
| 8,992,316 | B2 | 3/2015 | Smith |
| 9,083,654 | B2 | 7/2015 | Dawson |
| 9,152,914 | B2 | 10/2015 | Haggar |
| 9,205,328 | B2 | 12/2015 | Bansi |
| 9,286,731 | B2 | 3/2016 | Hamilton, II |
| 9,299,080 | B2 | 3/2016 | Dawson |
| 9,364,746 | B2 | 6/2016 | Chudley |
| 9,525,746 | B2 | 12/2016 | Bates |
| 9,583,109 | B2 | 2/2017 | Kurata |
| 9,682,324 | B2 | 6/2017 | Bansi |
| 9,764,244 | B2 | 9/2017 | Bansi |
| 9,789,406 | B2 | 10/2017 | Marr |
| 9,808,722 | B2 | 11/2017 | Kawachiya |
| 2009/0113448 | A1 | 4/2009 | Smith |
| 2014/0344725 | A1 | 11/2014 | Bates |
| 2016/0155261 | A1 * | 6/2016 | Iborra ..................... G06T 15/04 345/426 |
| 2016/0191671 | A1 | 6/2016 | Dawson |

FOREIGN PATENT DOCUMENTS

| | | | |
|---|---|---|---|
| CA | 2143874 | | 6/2000 |
| CA | 2292678 | | 7/2005 |
| CA | 2552135 | | 7/2013 |
| CN | 1334650 | A | 2/2002 |
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| CN | 109410300 | A * | 3/2019 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |

(56) References Cited

FOREIGN PATENT DOCUMENTS

| | | | |
|---|---|---|---|
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

OTHER PUBLICATIONS

Unity, Unity Manual Mar. 2019, 2020, Found at https://docs.unity3d.com/2019.3/Documentation/Manual/shadow-mapping.html (Year: 2020).*

Translation—CN109410300A, Song D, 2019 (Year: 2019).*

Olsson et al., More Efficient Virtual Shadow Maps for Many Lights, 2015 (Year: 2015).*

* cited by examiner

SYSTEMS AND METHODS FOR DYNAMICALLY, AUTOMATICALLY GENERATING AND/OR FILTERING SHADOW MAPS IN A VIDEO GAME

CROSS-REFERENCE

The present application relies on U.S. Patent Provisional Application No. 63/264,030, titled "Systems and Methods for Dynamically, Automatically Generating and/or Filtering Shadow Maps in a Video Game" and filed on Nov. 12, 2021, for priority, which is herein incorporated by reference in its entirety.

FIELD

The present specification relates generally to graphics processing in video games. More specifically, the present specification relates to systems and methods of dynamically, automatically scaling the resolution of shadow maps generated at runtime.

BACKGROUND

Computer graphics artists are tasked with defining the visual appearances of various objects or geometries and how the visual appearances of these objects and geometries change during gameplay. These objects or geometries are then modeled by a computer and rendered on a display screen. Video game consoles, or other computing devices, perform many functions related to graphics processing to ensure aspects such as, for example, the color, shape, position, orientation, direction of light and/or shadows of objects are properly presented in a video game scene.

Shadowing dramatically enhances the realism of virtual environments by providing useful visual cues about where objects appear relative to one another. Shadow mapping is an algorithmic technique widely used for the real-time rendering of high-fidelity shadows in video games. With shadow maps, a scene is rendered from the viewpoint of a light source and the depth of each pixel is stored into a shadow map. When rendering each pixel in the final image, a point is transformed into the light coordinate system, and a depth comparison is performed with the corresponding shadow map pixel to decide whether the point is hidden with respect to the light source. However, shadow mapping usually suffers from the inherent aliasing errors. Aliasing occurs when the local sampling density in the shadow is too low or too high.

As virtual characters leave or approach one or more lights, the shape and/or contour of the lights, and, in particular, the shadows formed by the lights being cast upon objects must change to reflect the virtual character's change in location or position. Conventionally, shadow maps are predetermined for various positions/locations in the games and specific computing resources are reserved/allocated based on an anticipation of specific shadow maps being required. However, pre-defining the resolution and size of a shadow can become very difficult while endeavoring to optimally balance performance and visual appearance. Different computing platforms have different processing hardware and, therefore, different capabilities when it comes to processing and rendering graphics. Given the wide variety of hardware capabilities and the need to present a relatively uniform experience to all users across all platforms, it is important to determine what a particular shadow map's resolution may be. In addition, it is important to determine how that shadow map's resolution should change as the player/virtual character moves through the scene.

Therefore, there is a need for systems and methods for generating shadows with resolutions that are dynamically modulated during runtime depending upon a memory budget specific to a gaming platform. There is also a need to reduce shadow artifacts such as, for example, aliasing errors and uneven spotting through the shadow, also referred to as acne.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer implemented method of dynamically modulating a resolution of each of a plurality of shadow maps corresponding to a plurality of lights in a frame of a video game scene, wherein the plurality of shadow maps are generated by a module executed on a player's computing device in data communication with at least one host computer and wherein the player's computer device comprises a memory configured to store electronic data, the method comprising: establishing an amount of the memory to be allocated for generating the plurality of shadow maps; determining a size of each of the plurality of shadow maps corresponding to the plurality of lights; determining an overall size of the plurality of shadow maps; determining a composite scaling factor for each of the plurality of lights; and applying the composite scaling factor across each of the plurality of shadows maps when the overall size exceeds a predefined threshold percentage of the allocated memory.

Optionally, the method further comprises defining the memory allocation based on a type of the player's computing device.

Optionally, the method further comprises determining the composite scaling factor by: determining a drop size scale for each of the plurality of lights; computing a distance of each of the plurality of lights from a camera; and obtaining a function of the distance and the drop size scale for each of the plurality of lights.

Optionally, the predefined threshold is in a range of 70% to 90%.

Optionally, application of the composite scaling factor results in decreasing a resolution of each of the plurality of shadows.

Optionally, the method further comprises performing a filtering function and generating the plurality of shadows when the overall size does not exceed the predefined threshold percentage of the allocated memory.

Optionally, a number of shadow updates performed per frame of the video game scene is maintained within a predefined time frame.

Optionally, the method further comprises implementing two-stage caching in order to reduce shadow draw-calls.

Optionally, the method further comprises baking static shadows in the video game scene into a compressed shadow tree.

In some embodiments, the present specification is directed toward a computer readable non-transitory medium comprising a plurality of executable programmatic instructions wherein, when said plurality of executable programmatic instructions are executed by a processor in a computing device, a process is performed for modulating a resolution of each of a plurality of shadows corresponding to a plurality of lights in a frame of a video game scene, wherein the plurality of executable programmatic instructions are at least partially executed by a module in a player's computing device in data communication with at least one host computer and using a memory in the player's computing device, and wherein the process comprises: defining an amount of the memory to be allocated for generating the plurality of shadows; determining a size of each of a plurality of shadow maps corresponding to the plurality of lights; determining an overall size of the plurality of shadow maps; determining a composite scaling factor for each of the plurality of lights; and applying the composite scaling factor across each of the plurality of shadows maps when the overall size exceeds a predefined threshold percentage of the allocated memory.

Optionally, the process further comprises defining the amount of allocated memory based on a type of the player's computing device.

Optionally, the process further comprises determining the composite scaling factor by: determining a drop size scale for each of the plurality of lights; computing a distance of each of the plurality of lights from a camera; and obtaining a function of the distance and the drop size scale for each of the plurality of lights.

Optionally, the predefined threshold is in a range of 70% to 90%.

Optionally, the process further comprises applying the composite scaling factor to decrease a resolution of each of the plurality of shadows.

Optionally, the process further comprises performing a filtering function and generating the plurality of shadows when the overall size does not exceed the predefined threshold percentage of the allocated memory.

Optionally, a number of shadow updates performed per frame of the video game scene is maintained within a predefined time frame.

Optionally, the process further comprises implementing two-stage caching in order to reduce shadow draw-calls.

Optionally, the process further comprises baking static shadows in the video game scene into a compressed sparse shadow tree.

In some embodiments, the present specification is directed toward a computer implemented method of generating target filtering values of a plurality of pixels of a shadow, wherein the filtering values are indicative of occluding shadow percentage of the plurality of pixels, and wherein the method is at least partially implemented by a module executed on a player's computing device in data communication with at least one host computer, the method comprising: determining first filtering values indicative of an amount of attenuation for each pixel of the shadow; transforming the first filtering values in order to generate the target filtering values indicative of an amount of attenuation to be applied for each pixel of the shadow; and using the target filtering values to shade the plurality of pixels of the shadow.

Optionally, the first filtering values are determined based on a percentage closer filtering algorithm.

Optionally, the first filtering values, when plotted, generate a linear graph.

Optionally, the target filtering values, when plotted, generate a curved graph having a slope that varies relative to the linear graph.

Optionally, the target filtering values are generated using a kernel based on world space.

Optionally, the kernel is automatically generated based on a size of a light corresponding to the shadow.

Optionally, a pixel having a target filtering value less than 50% is shadowed whereas a pixel having a target filtering value greater than 50% is subjected to reduced shadowing.

Optionally, the target filtering values soften up the shadow corresponding to the first filtering values.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
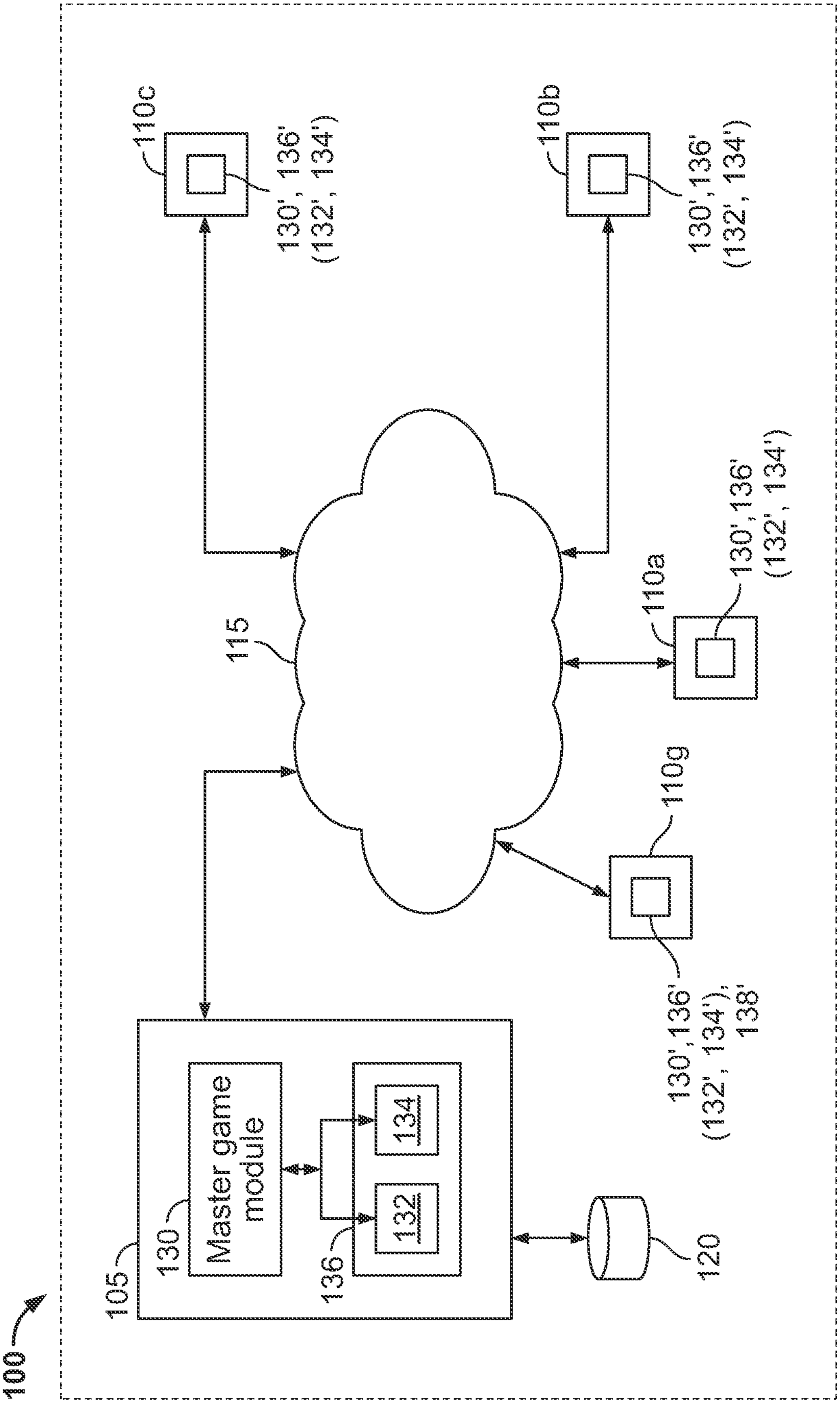
FIG. 1 illustrates an embodiment of a multi-player online gaming platform/environment or a massively multiplayer online gaming system/environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming platform" or "or massively multiplayer online game" may be construed to mean a specific hardware architecture in which one or more servers electronically communicate with, and concurrently support game interactions with, a plurality of computing devices, thereby enabling each of the computing devices to simultaneously play in the same instance of the same game. Preferably the plurality of computing devices number in the dozens, preferably hundreds, preferably thousands. In one embodiment, the number of concurrently supported computing devices ranges from 10 to 5,000,000 and every whole number increment or range therein. Accordingly, a multi-player gaming platform/environment or a massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "gaming platform" used in this disclosure may refer to hardware and/or software specifications of a player's computing device (which may be a PC or a gaming console, for example). In some embodiments, "platform" may refer to at least GPU (Graphics Processing Unit) specification, CPU specification, display screen resolution, RAM and hard disk space available and a type of operating system.

The term "runtime" or "runtime process" used in this disclosure refers to one or more programmatic instructions or code that may be implemented or executed during gameplay (that is, while the one or more game servers are rendering a game for playing).

The term "graphics rendering pipeline" used in this disclosure refers to a conceptual model that describes what steps a graphics system needs to perform to render a 3D scene to a 2D screen. Once a 3D model has been created, for instance in a video game or any other 3D computer animation, the graphics pipeline is the process of turning that 3D model into what the computer displays.

The term "user" used in this disclosure may refer to a graphics artist or someone who is responsible for creating customized assets or objects for rendering in the game. The term "player" refers to a person involved in playing a game.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1 illustrates an embodiment of a multi-player online gaming platform/environment or a massively multiplayer online gaming system/environment 100 in which the systems and methods of the present specification may be implemented or executed, in accordance with some embodiments. Referring now to FIG. 1, the gaming platform 100 comprises at least one server or host computer 105 that is in data communication with one or more computing devices 110 over a network 115. Players may access the gaming platform 100 via the one or more computing devices 110 (110*a*, 110*b* and 110*c*). Additionally, a user such as, for example, a graphics artist may access the gaming platform 100 as well as various modules or engines via a computing device 110*g*. The computing devices 110 comprise devices such as, but not limited to, personal or desktop computers, laptops, Netbooks, handheld devices such as smartphones, tablets, and PDAs, gaming consoles and/or any other computing platform known to persons of ordinary skill in the art. Although four computing devices 110*a* through 110*c* and 110*g* are illustrated in FIG. 1, any number of computing devices 110 can be in communication with the at least one server or host computer 105 over the network 115.

The at least one server or host computer 105 can be any computing device having one or more processors and one or more computer-readable storage media such as RAM, hard disk or any other optical or magnetic media. The at least one server or host computer 105 includes a plurality of modules operating to provide or implement a plurality of functional, operational or service-oriented methods of the present specification. In some embodiments, the at least one server or host computer 105 includes or is in communication with at least one database system 120. The database system 120 stores a plurality of game data including data representative of gaming assets, geometries or objects associated with one or more games that are served or provided to the computing devices 110 over the network 115. In some embodiments, the at least one server or host computer 105 may be implemented by a cloud of computing platforms operating together as servers or host computers 105.

In accordance with aspects of the present specification, the at least one server or host computer 105 provides or implements a plurality of modules or engines such as, but not limited to, a master game module 130 and a rendering module 136 that is configured to execute an auto-resolution module 132 and a filtering module 134 among additional modules required to implement a graphics rendering pipeline on each of the one or more computing devices 110. In some embodiments, the one or more computing devices 110 are configured to implement or execute one or more of a plurality of player-side modules some of which are same as or similar to the modules of the at least one server or host computer 105. For example, in some embodiments each of the player computing devices 110*a* through 110*c* is configured to execute a player-side game module 130' (also referred to as—player game module 130') that integrates a player-side rendering module 136' (also referred to as—player rendering module 136') further comprising player-side auto-resolution module 132' and filtering module 134' while the at least one non-player computing device 110*g* is configured to execute the player game module 130' that integrates a user-side graphics management module 138' and the user-side rendering module 136'. In some embodiments, the graphics management module 138' is used by the graphics artist or designer (at the computing device 110*g*) to log into the at least one game server 105 in order to set up and customize various parameters related to the graphics rendering pipeline.

While various aspects of the present specification are being described with reference to functionalities or programming distributed across modules or engines 130, 130', 136, and 136' on the server and player sides, it should be appreciated that, in some embodiments, some or all of the functionalities or programming associated with these modules or engines may be integrated within fewer modules or in a single module—such as, for example, in the master game module 130 itself on the server side and in the player gaming module 130' on the user side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the computing devices 110 and transmits updates to all computing devices 110 based on the received game data so that the game, on each of the computing devices 110, represents the most updated or current status with reference to interactions of all players with the game. Thus, the master game module 130 transmits game data over the network 115 to the computing devices 110 for use and rendering by the player gaming module 130' to provide local versions and current status of the game to the players.

On the player-side, each of the one or more computing devices 110 is configured to implement the player gaming module 130' that operates as a gaming application providing a player with an interface between the player and the game. The player gaming module 130' is configured to generate the interface to render a virtual environment, virtual space, game space, map or virtual world associated with the game and thus enables the player to interact in the virtual environment to perform a plurality of game and other tasks and objectives. The player gaming module 130' is configured to access at least a portion of game data, received from the game server or host computer 105, to provide an accurate representation of the game to the player. The player gaming module 130' is configured to capture and process player inputs and interactions within the virtual world or environment and provide at least a portion of said inputs or interactions as updates to the game server or host computer 110 over the network 115.

In some embodiments, the game module 130' (for each of the one or more player computing devices 110) is also configured to integrate the player-side rendering module 136' that, in data communication with the server-side rendering module 136, is configured to implement a plurality of instructions or programmatic code to perform a plurality of tasks (during runtime or execution of gameplay) associated with various processing stages of the graphics rendering pipeline including the tasks/functions corresponding to the auto-resolution module 132 and the filtering module 134.

In some embodiments, the rendering module 136' is integrated into the game module 130' (for each of the one or more player computing devices 110) that, in data communication with the server-side master game module 130, is configured to implement a plurality of instructions or programmatic code to perform a plurality of tasks (during runtime or execution of gameplay) associated with various processing stages of the graphics rendering pipeline including the tasks/functions corresponding to the auto-resolution module 132' and the filtering module 134'. Stated differently, in such embodiments, the rendering module 136' including the auto-resolution module 132' and the filtering module 134' are player-side components while there are no server-side counterpart components (namely, the rendering module 136, including the auto-resolution module 132 and the filtering module 134).

In some embodiments, the player-side computing devices 110 are thin clients such that the game module 130' does not integrate the rendering module 136' (including the auto-resolution module 132' and the filtering module 134'). Thus, in such embodiments, the rendering module 136 including the auto-resolution module 132 and the filtering module 134 are server-side components while there are no player-side counterpart components.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations. In some embodiments, the database system 120 may store a plurality of data such as, but not limited to, game data, gaming assets or objects data, and programming instructions with reference to various modules 130, 132, 134 and 136.

Rendering Module (Executing Runtime Processes)

In various embodiments, the server-side and player-side rendering modules 136, 136' include rendering logic, for example: hardware, firmware, and/or software. This rendering logic is configured to create frames of the video game stream based on the game state during runtime. In some embodiments, all or part of the rendering logic is disposed or implemented within a graphics processing unit (GPU) at each of the one or more computing devices 110. Rendering logic typically includes processing stages configured for determining the three-dimensional spatial relationships between objects and/or for applying appropriate textures, shading, and other characteristics based on the game state and viewpoint. In various embodiments, the rendering modules 136, 136' are also configured to generate or render one or more shadows corresponding to one or more lights in a game scene or frame.

Auto-Resolution Module

In accordance with some aspects of the present specification, the auto-resolution modules 132, 132' are configured to implement a plurality of instructions or programmatic code to generate shadows having resolutions that are dynamically modulated or scaled during runtime based on a targeted or budgeted memory that is specific to a gaming platform of a computing device 110. In accordance with aspects of the present specification, a game scene may have a plurality of shadows of different resolutions which are dynamically determined and modulated based on a real-time performance and a memory budget specific to a given gaming platform. In other words, the game scene may have multiple shadow portions rendered at different resolutions. For example, a first light may cast a corresponding first shadow rendered at a first resolution of 640×480, and a second light may cast a corresponding second shadow rendered at a second resolution of 1280×720 wherein the first and second shadows are displayed concurrently in a game scene.

In embodiments, the auto-resolution modules 132, 132' use a descriptor to dynamically call on various resources in a computing device 110, without pre-allocating the resource. This allows the generation of a shadow map at any resolution without the need to have a standard predefined resolution. In other words, the auto-resolution modules 132, 132' are configured to leverage bindless computing which does not require binding a specific amount of memory to a rendering task having a predefined resolution. Accordingly, there is no limitation of requiring textures to be bound by the CPU to a particular slot in a fixed-size table before the GPU can use them.

In accordance with some aspects of the present specification, graphic artists define various lights depending upon what is required visually during gameplay. The artists determine various characteristics of the lights such as, but not limited to, size of the lights and the light fall-off parameters. The auto-resolution modules 132, 132' are programmed to automatically generate a shadow map (at runtime) based at least on the light parameters set up by the artist. This results in an automated system of what the resolution of the shadow map should be unlike the conventional approach. In various embodiments, the graphics artists can override this automated determination of the resolution of the shadow map (that is, push it to be sharper or softer).

Figure 2:
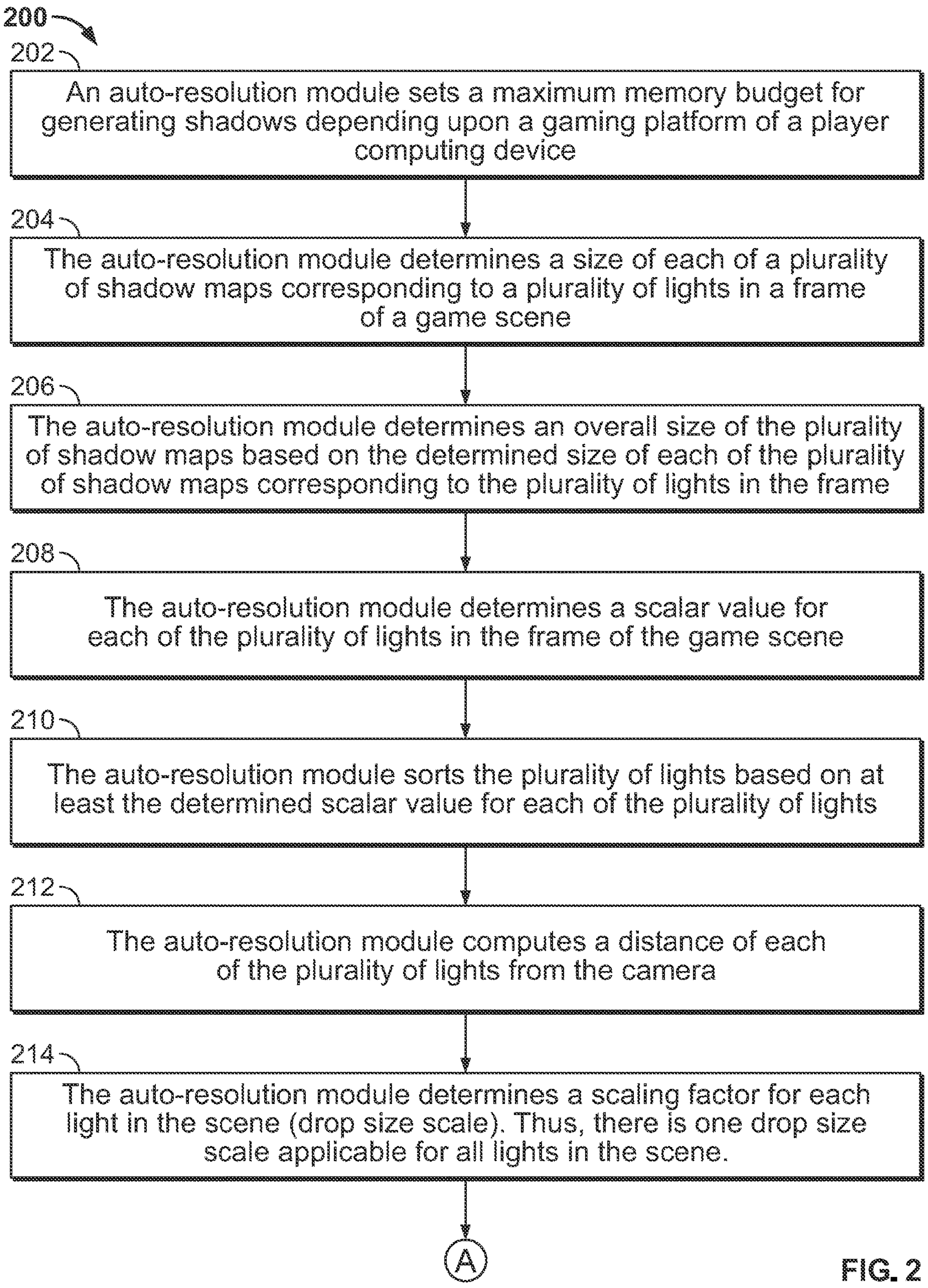
FIG. 2 is a flowchart of a plurality of exemplary steps of a method of dynamic modulation of resolution of one or more shadows generated in a game scene, in accordance with some embodiments of the present specification.
Figure 2:
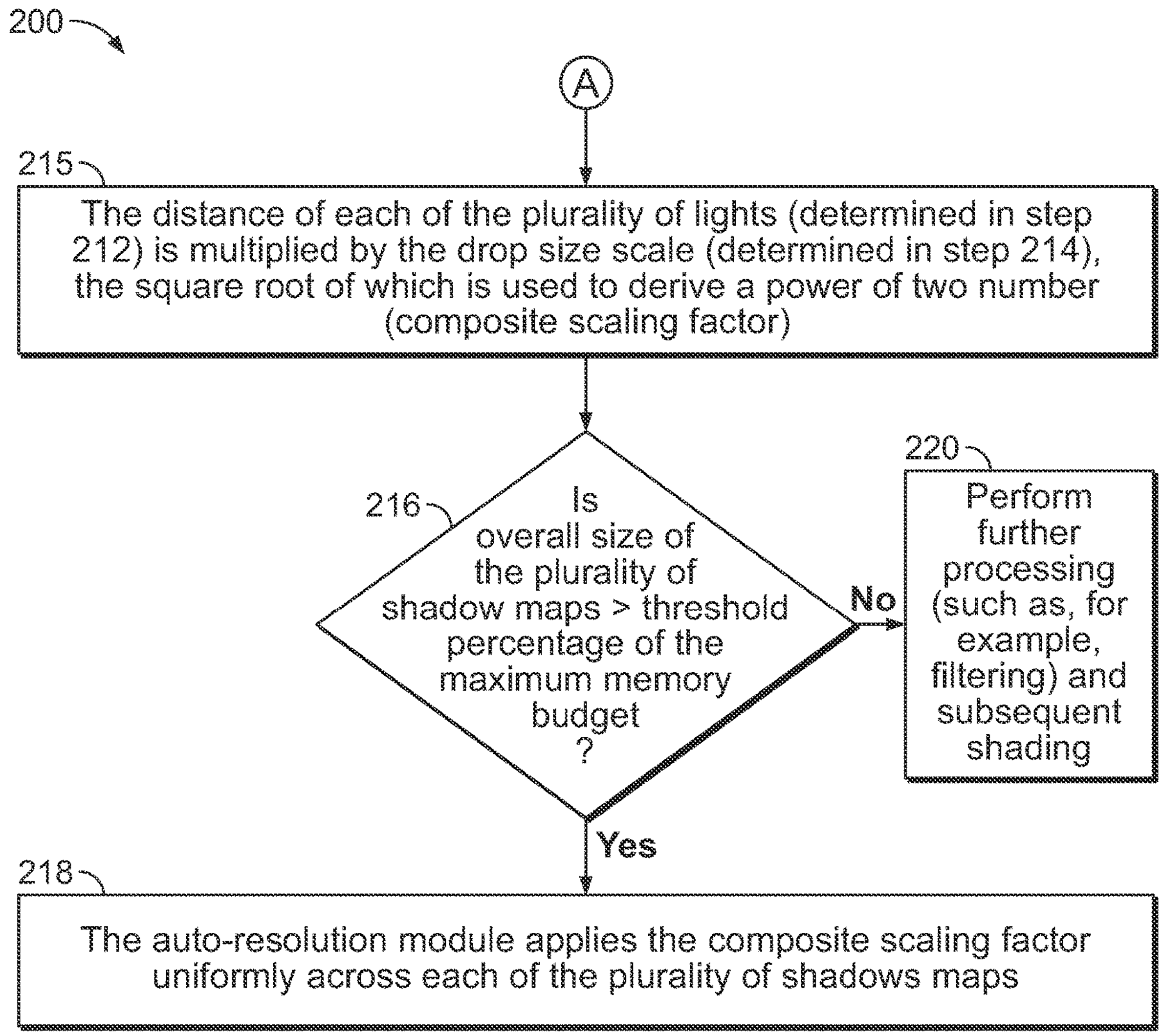

FIG. 2 is a flowchart of a plurality of exemplary steps of a method 200 of dynamic modulation of resolution of one or more shadows generated in a game scene, in accordance with some embodiments of the present specification. In some embodiments, the client-side auto-resolution module 132' within the rendering module 136' (shown in FIG. 1) is configured to implement the steps of method 200. That is, the method 200 is implemented at the client-side only. In alternate embodiments, the auto-resolution modules 132, 132' within the rendering modules 136, 136' (shown in FIG. 1) are configured to implement the steps of method 200. That is, the method 200 is implemented at the server-side and client side in coordination with one another. At step 202, the auto-resolution module sets a maximum memory budget for generating shadows depending upon the gaming platform of a player computing device. In some embodiments, the maximum memory budget ranges from 16 MB to 4096 MB.

At step 204, the auto-resolution module determines a size of each of a plurality of shadow maps corresponding to a plurality of lights in a frame of a game scene (which is the base shadow resolution). The base shadow resolution is decided once for each light and does not change and depends on how much area the light covers. The sizing of the plurality of shadow maps is based on the definition of lights by the graphic artists. In some embodiments, in order to determine a size of a shadow map, a coverage area or box of a corresponding light is computed. For example, for a directional light, the coverage area or box is the entire display screen; for a spotlight, the coverage area or box is a bounding rectangle of the spotlight's pyramid projected on the display screen; and for a point light the coverage area or box is a bounding rectangle of the point light's sphere projected on the display screen. The determined coverage area or box provides a width and a height in terms of pixels. In some embodiments, the larger value of the width and height is determined as the pixel size of a shadow map.

At step 206, the auto-resolution module determines an overall size of the plurality of shadow maps based on the determined size of each of the plurality of shadow maps corresponding to the plurality of lights in the frame. In some embodiments, the overall size of the plurality of shadow maps is determined assuming a high level of resolution (say, for example, 2K×2K) for each of the plurality of shadow maps.

At step 208, the auto-resolution module determines a scalar value for each light of the plurality of lights in the frame of the game scene. Thus, for each light of the plurality of lights, a single scalar value is calculated that is different for each light. The scalar value represents the closest distance to the camera for the light.

At step 210, the auto-resolution module sorts the plurality of lights based on at least the determined scalar value for each of the plurality of lights. In addition, the sorting may depend upon other factors such as whether the light moves and how old the shadow map is, as shadows that have not been updated recently are considered to be more out of date than shadows which were recently updated. The older shadows are considered to be more out of date because geometry objects may animate or may change their level of detail according to a distance from the camera and/or because objects may move in and out of the shadow area. Presumably, the older shadows are more noticeably incorrect, in terms of shadow moving objects. The sorting function allows a preference for updating lights that are closer or moving or those lights that have not been updated in a while. Thus, the quality of the lights that are more visible to the player can be improved preferentially. After sorting, the lights are processed in an order where the more important lights are first, so that if memory or time is running out, the less important lights are skipped.

At step 212, the auto-resolution module computes a distance of each of the plurality of lights from a predefined camera viewpoint. In embodiments, the predefined camera viewpoint is the position in space from which the game scene is rendered—that is, an apparent position of the viewer. Thus, the distance is a Euclidean distance in space.

At step 214, the auto-resolution module determines a scaling factor for each of the lights in the scene, referred to as the "drop size scale". Thus, there is one drop size scale applicable for all lights in the scene. The drop size scale is a number that is adjusted every frame in accordance with how the total memory consumption of shadow maps compares to the target memory consumption, which is typically on the order of 80% of the maximum memory reserved for shadows. When memory usage is too high, the drop size scale has a larger value and when the memory usage is low, the drop size scale has a smaller value. The drop size scale affects all of the lights in the scene in a consistent way.

At step 215, the distance of each of the plurality of lights (determined in step 212) is multiplied by the drop size scale (determined in step 214), and scaled by other tunable controls, resulting in a value. Other tunable controls refer to a plurality of tunable scalars—each of which can be adjusted separately for each gaming or client hardware platform. The square root of the resultant value is then obtained and subsequently used to derive a power of two number (composite scaling factor) which divides the base shadow resolution of the light, as described at step 204. It should be noted that the shadow map dimensions only change by being multiplied or divided by 2, which allows for a fast operation to reduce size when the dimension is reduced.

At step 216, the auto-resolution module checks if the overall size of the plurality of shadow maps exceeds a predefined threshold percentage of the maximum memory budget for the gaming platform. In some embodiments, the predefined threshold percentage is 80%. In various embodiments, the predefined threshold percentage may vary from 70% to 90%.

If the overall size of the plurality of shadow maps exceeds the predefined threshold percentage then, at step 218, the auto-resolution module applies the composite scaling factor (which in this example, was derived at step 215) uniformly across each of the plurality of shadow maps. This results in dynamic downward modulation or scaling down of the resolution of each of the plurality of shadow maps and, therefore, a downward modulated overall size of the plurality of shadow maps. This ensures that the modulated overall size of the plurality of shadow maps does not exceed the predefined threshold percentage. In some embodiments, application of the composite scaling factor to each of the plurality of shadow maps ensures that a big light that is far away from the camera is defined by a resolution that is similar to a comparatively small light that is closer to the camera.

If the overall size of the plurality of shadow maps does not exceed the predefined threshold percentage then, at step 220, the process proceeds to perform further processing (such as, for example, filtering) and subsequent shading in order to generate each of the plurality of shadows.

In some embodiments, the resolution of each of the plurality of shadow maps can potentially change at every frame. However, in some embodiments, the auto-resolution module preferably maintains the resolution for several frames.

It should be appreciated that the sequence of steps of the method 200 may vary in various embodiments. For example, in some embodiments, step 216 may be performed immediately after step 206 while steps 208, 210, 212, and 215 may be performed after step 216 and prior to step 218. That is, the composite scaling factor and its components may be determined only if the overall size of the plurality of shadow maps exceeds the predefined threshold percentage and not otherwise. It should be noted that in a preferred implementation, the drop size scale is calculated every frame, and this scale is used every frame to scale all of the shadow maps. In some cases, the scale is consistent enough that no shadow maps change size, however, it is still always calculated and used.

Filtering Module

Once the resolution of a shadow map is dynamically established using the method 200 of FIG. 2, the client-side and/or server-side rendering modules are/is configured to perform shading in order to generate a shadow. In accordance with some aspects of the present specification, the shading process leverages a filtering method to substantially reduce artifacts such as, for example, aliasing and acne—typically arising in a shadow generated using the conventional shadow mapping technique.

As known to persons of ordinary skill in the art, the shadow mapping technique involves two stages, the first stage renders a scene from the point of view of the light with depth testing enabled and records depth information for each fragment. The depth information is typically stored in a z-buffer. The resulting depth image (the shadow map) contains depth information for the fragments that are visible from the light source, and therefore, are occluders for any other fragment behind them from the point of view of the light. Stated differently, these represent the only fragments in the scene that receive direct light, every other fragment is in the shade. In the second stage, the scene is rendered normally from the point of view of the camera. Depth testing is then performed wherein for each fragment the distance to the light source is computed and compared against the depth information recorded in the z-buffer in the first stage to determine if the fragment is behind a light occluder or not. If it is, then the diffuse and specular components for the fragment are removed, resulting in a shadow-like visual.

In some embodiments, at least one of the filtering modules 134, 134' is configured to implement a plurality of instructions or programmatic code to perform the filtering method while generating one or more shadows. In embodiments, the filtering method is an enhanced Percentage Closer Filtering (PCF) process, referred to as Dilated Percentage Closer Filtering (DPCF). In accordance with an aspect of the present specification, the filtering modules 134, 134' predict a maximum size of penumbra of a shadow based on a size of a corresponding light. The predicted maximum size of penumbra is then used to compute a maximum percentage of a shadow map that needs to be filtered.

Figure 3:
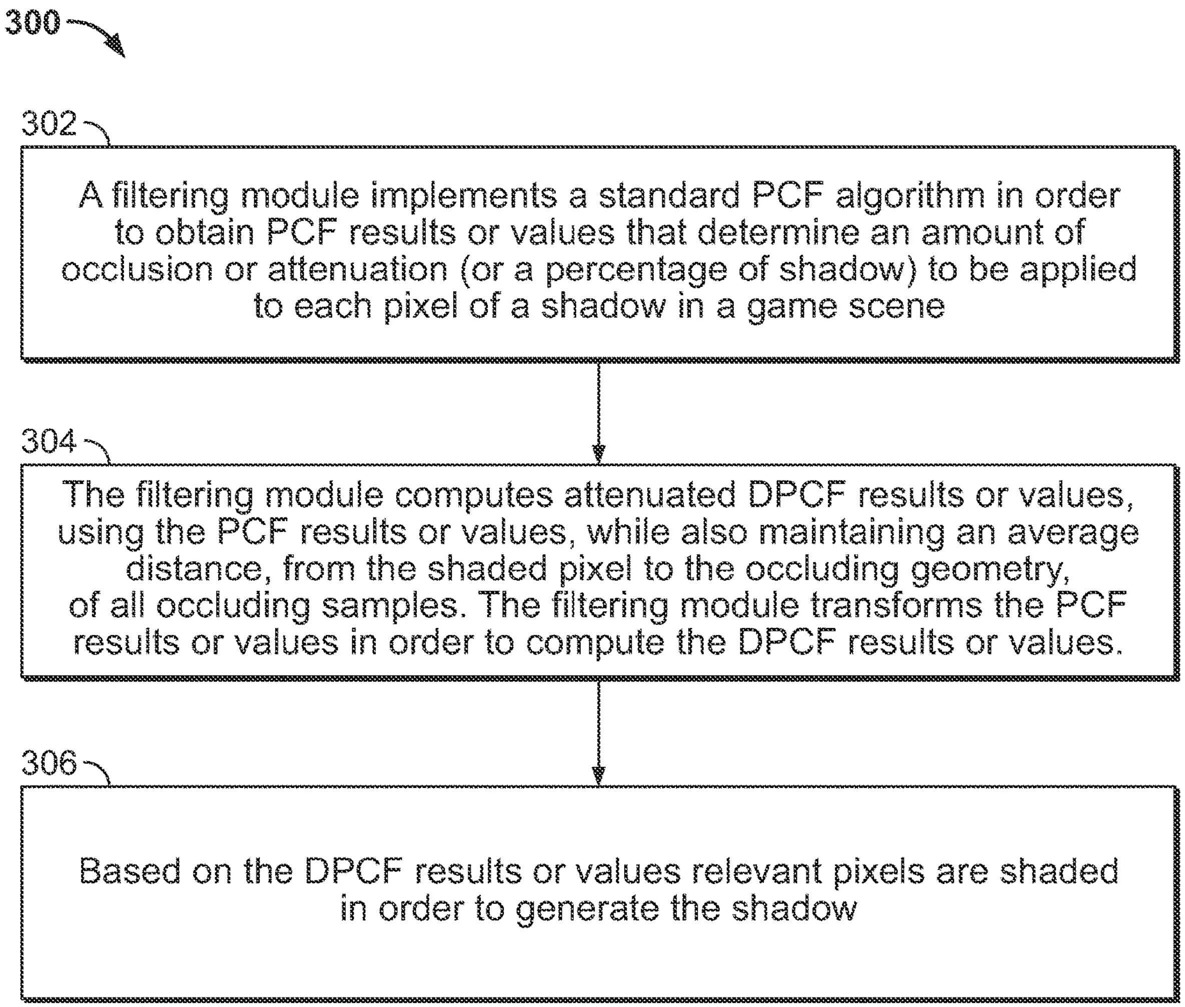
FIG. 3 is a flowchart of a plurality of exemplary steps of a method of generating filtering results in order to determine an occluding shadow percentage of a pixel of a shadow, in accordance with some embodiments of the present specification.

FIG. 3 is a flowchart of a plurality of exemplary steps of a method 300 of generating DPCF results or values in order to determine occluding shadow percentage of a pixel (of a plurality of pixels) of a shadow, in accordance with some embodiments of the present specification. In some embodiments, the client-side filtering module 134' within the rendering module 136' (both shown in FIG. 1) is configured to access the depth values stored in the z-buffer and implement the steps of method 300. That is, the method 300 is implemented at the client-side only. In alternate embodiments, the filtering modules 134, 134' are configured to access the depth values stored in the z-buffer and implement the steps of method 300. That is, the method 300 is implemented at the server-side and client side in coordination with one another.

At step 302, the filtering module implements a standard PCF algorithm in order to obtain PCF results or values that determine an amount of occlusion or attenuation (or a percentage of shadow) for each pixel of the shadow in a game scene. As known to persons of ordinary skill in the art, for a target pixel, the PCF algorithm involves performing additional shadow depth tests to compare a depth value of the target pixel against depth values of neighboring pixels in a shadow map. The number of additional shadow tests to be performed for the neighboring pixels depends upon a size of a PCF kernel. The outcomes from the shadow depth tests (that are binary in nature—that is, whether a pixel is lit or is in shadow) are averaged to compute a percentage of pixels (including the target pixel and the neighboring pixels) that are in shadow thereby determining the amount of occlusion or attenuation (or a percentage of shadow) to be applied to the target pixel.

Figure 4:
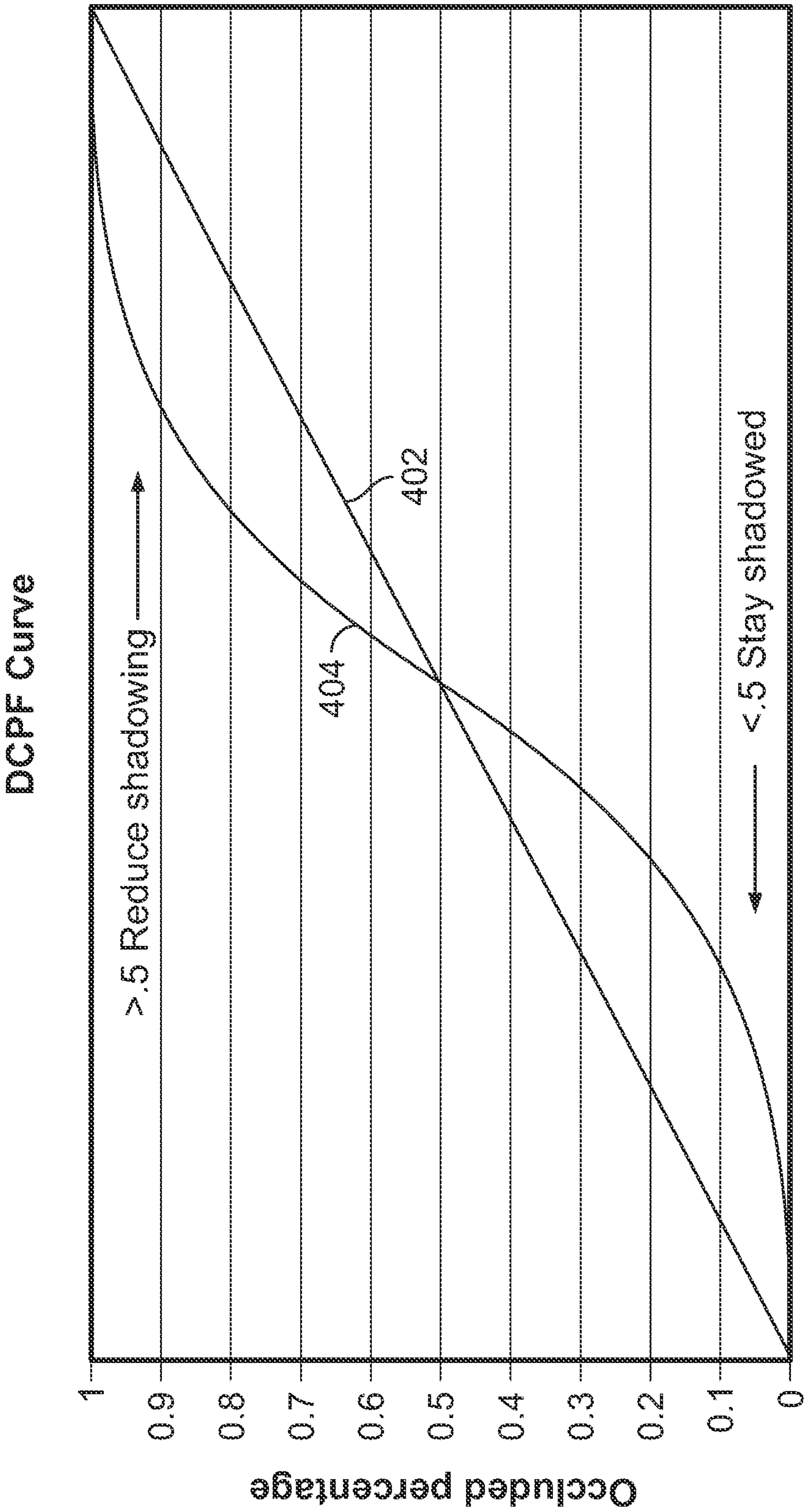
FIG. 4 shows a first plot of a first set of filtering results and a second set of filtering results, in accordance with some embodiments of the present specification.

As shown in FIG. 4, the plotted PCF results or values generate a linear graph 402 with occluding shadow percentage values for pixels ranging linearly from 0 to 1.

At step 304, the filtering module computes attenuated DPCF results or values, using the PCF results or values obtained in step 302, while also maintaining an average distance, from the shaded pixel to the occluding geometry, of all occluding samples (that is, the projected, to light-space, geometry that is occluding the sample being shaded). Thus, the filtering module transforms the PCF results or values in order to compute the attenuated DPCF results or values. A transformation of the average occluding distance is used to dilate the PCF result by linearly interpolating between the lighter PCF result and darker PCF result. This transformation of the average occluding distance involves moving the distance from a space of 0 to 1 to 1 to 1 and then taking the absolute value. The DPCF results or values are indicative of an amount of occlusion or attenuation (or a percentage of shadow) to be applied to each pixel of the shadow. In accordance with aspects of the present specification, DPCF is a depth aware filtering technique. In some embodiments, the DPCF uses depth results to modulate a fixed PCF kernel that is world space-based since the resolution of the shadow is modulated in real-time and is not pre-determined. In some embodiments, the kernel is automatically generated based on a size of a light corresponding to the shadow.

As shown in FIG. 4, the DPCF values are used to generate a graph 404 where the slope of the graph begins as smaller than the PCF line (not shown), becomes greater than the PCF line, and then becomes smaller again relative to the PCF line, thereby generating a curve. In some embodiments, the curved DPCF graph 404 intersects the linear PCF graph 402 at an occluding shadow percentage value of 50% (or 0.5). With reference to the DPCF graph 404, pixels having an occluding shadow percentage value less than 50% stay shadowed whereas pixels having an occluding shadow percentage value greater than 50% are subjected to reduced shadowing. In embodiments, the curved DPCF graph defines the tightness or softness of a light's fall off. Graphics artists can subsequently modify the tightness by manipulating the computed curved DPCF graph, or in other words, tighten up for some lights and soften for others. Consequently, acne (false dark spots) artifacts are substantially reduced from the shadow process. Thus, essentially, the filtering results or values associated with the curved DPCF graph softens up the PCF results or values of step 302.

At step 306, based on the DPCF results or values relevant pixels are shaded in order to generate the shadow. In some embodiments, a shader program performs shading (lighting and/or material evaluation) of the pixels.

Referring back to FIG. 1, in some embodiments, the server-side modules 130, 136 and/or player-side modules 130', 136' of the gaming system 100 are configured to implement additional instructions or programmatic code to execute methods related to auto-performance scaling, two-stage caching, and compressed bake directed towards improving the runtime quality and performance associated with rendering shadows.

Auto-Performance Scaling

In some embodiments, the gaming system 100 is configured to stay within a predefined targeted or budgeted time to perform shadow updates per frame that is specific to a gaming platform (in order to maintain graphics quality and rendering performance for a desired frames per second refresh rate). Stated differently, the gaming system 100 is configured to limit shadow updates to a predefined target—such as, for example, 12 to 24 shadow updates in 2 milliseconds. Consequently, when the system 100 is configured to determine that the predefined target for a computing device is likely to be exceeded, the system 100 is configured to automatically transition to reducing or dropping out the number of shadow updates per frame. In some embodiments, in order to avoid having to draw too many shadow updates per frame, the system 100 is configured to drop out or reduce updates for dynamic shadows first. In some embodiments, the system 100 is configured to prioritize dropping out dynamic shadow updates for smaller geometries. When there is a transition from a dynamic shadow to a static shadow, a temporary light may be created for the dynamic shadow. The temporary light is then crossfaded with the static light. Thus, the temporary (dynamic) light starts at an intensity of 1.0 and reduces to an intensity of zero, at which time it is removed. The static light starts at zero intensity and increases to 1.0 (and continues to exist). This creates a visually smooth transition when changing the type of shadow (as it also works in the other direction). The fade transition typically occurs over a period of ten frames. As targeted performance improves, the system 100 adds back the previously dropped out dynamic shadow updates.

Two-Stage Caching

In some embodiments, the gaming system 100 is configured to implement a two-stage caching method directed towards optimizing or reducing the number of shadow draw-calls. The two-stage caching method is desirable where there are a large number of lights per frame and therefore a large number of corresponding shadows to be drawn which may lead to exceeding a targeted or budgeted shadow updates per frame for a gaming platform.

The concept of the two-stage caching method is that static scene geometry need not be redrawn when a dynamic geometry moves. For example, imagine a virtual character (having 7000 primitives, which in this case is a triangle—the geometric object rendered to the shadow map) running across a highly detailed stadium (having 100,000 primitives) with a plurality of lights in the stadium. In some embodiments, the two-stage cache method is designed to mark the background scene geometry (that is, the stadium in the example) as static and the virtual character as dynamic. Consequently, the method renders a shadow map cache of the static scene once. When the dynamic geometry (that is, the virtual character in the example) moves, the method causes the static cache to be copied into a rendering buffer, and then the dynamic geometry is drawn on top of that, instead of re-rendering the entire scene. This substantially reduces the amount of geometry that the renderer has to draw to update shadows corresponding to the lighting.

Compressed Bake

In some embodiments, the gaming system 100 is configured to implement a method that bakes all the static shadows in a scene into a compressed SST (Sparse Shadow Tree). This results in compressing large size shadow maps to a substantially small size shadow maps. The compressed SST replaces all static shadow maps for PSSM (Parallel Split Shadow Map) decode and fallback. As known to persons of ordinary skill in the art, in the PSSM technique the view frustum is split into multiple depth layers using clip planes parallel to the view plane, and an independent shadow map is rendered for each layer. Thus, to facilitate filtering and provide a seamless transition to dynamic shadows the method decompresses baked static occluders from SST into a PSSM. In some embodiments, the method uses low resolution SST for far objects/geometries in a scene.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer implemented method of dynamically modulating a resolution of each of a plurality of shadow maps corresponding to a plurality of lights in a frame of a scene in a video game, wherein the plurality of shadow maps are generated by a module executed on a player's computing device in data communication with at least one host computer and wherein the player's computer device comprises a memory configured to store electronic data, the method comprising:
- establishing an amount of the memory to be allocated for generating the plurality of shadow maps;
- determining a size of each of the plurality of shadow maps corresponding to the plurality of lights;
- determining an overall size of the plurality of shadow maps;
- determining a composite scaling factor for each of the plurality of lights; and
- during runtime of the video game, uniformly applying the composite scaling factor across each of the plurality of shadows maps when the overall size exceeds a predefined threshold percentage of the allocated memory.

2. The computer-implemented method of claim 1, further comprising defining the memory allocation based on a type of the player's computing device.

3. The computer-implemented method of claim 1, further comprising determining the composite scaling factor by:
- determining a drop size scale for each of the plurality of lights;
- computing a distance of each of the plurality of lights from a camera; and
- obtaining a function of the distance and the drop size scale for each of the plurality of lights.

4. The computer-implemented method of claim 1, wherein the predefined threshold percentage of the allocated memory is in a range of 70% to 90%.

5. The computer-implemented method of claim 1, wherein application of the composite scaling factor results in decreasing a resolution of each of the plurality of shadows.

6. The computer-implemented method of claim 1, further comprising performing a filtering function and generating the plurality of shadows when the overall size does not exceed the predefined threshold percentage of the allocated memory.

7. The computer-implemented method of claim 6, wherein a number of shadow updates performed per frame of the video game scene is maintained within a predefined time frame.

8. The computer-implemented method of claim 6, further comprising implementing two-stage caching in order to reduce shadow draw-calls.

9. The computer-implemented method of claim 6, further comprising baking static shadows in the video game scene into a compressed shadow tree.

10. A computer readable non-transitory medium comprising a plurality of executable programmatic instructions wherein, when said plurality of executable programmatic instructions are executed by a processor in a computing device, a process is performed for modulating a resolution of each of a plurality of shadows corresponding to a plurality of lights in a frame of a scene in a video game, wherein the plurality of executable programmatic instructions are at least partially executed by a module in a player's computing device in data communication with at least one host computer and using a memory in the player's computing device, and wherein the process comprises:
- defining an amount of the memory to be allocated for generating the plurality of shadows;
- determining a size of each of a plurality of shadow maps corresponding to the plurality of lights;
- determining an overall size of the plurality of shadow maps;
- determining a composite scaling factor for each of the plurality of lights; and
- during runtime of the video game, uniformly applying the composite scaling factor across each of the plurality of shadows maps when the overall size exceeds a predefined threshold percentage of the allocated memory.

11. The computer readable non-transitory medium of claim 10, wherein the process further comprises defining the amount of allocated memory based on a type of the player's computing device.

12. The computer readable non-transitory medium of claim 10, wherein the process further comprises determining the composite scaling factor by:
- determining a drop size scale for each of the plurality of lights;
- computing a distance of each of the plurality of lights from a camera; and
- obtaining a function of the distance and the drop size scale for each of the plurality of lights.

13. The computer readable non-transitory medium of claim 10, wherein the predefined threshold percentage of the allocated memory is in a range of 70% to 90%.

14. The computer readable non-transitory medium of claim 10, wherein the process further comprising applying the composite scaling factor to decrease a resolution of each of the plurality of shadows.

15. The computer readable non-transitory medium of claim 10, wherein the process further comprises performing a filtering function and generating the plurality of shadows when the overall size does not exceed the predefined threshold percentage of the allocated memory.

16. The computer readable non-transitory medium of claim 10, wherein a number of shadow updates performed per frame of the video game scene is maintained within a predefined time frame.

17. The computer readable non-transitory medium of claim 10, wherein the process further comprises implementing two-stage caching in order to reduce shadow draw-calls.

18. The computer readable non-transitory medium of claim 10, wherein the process further comprises baking static shadows in the video game scene into a compressed sparse shadow tree.

* * * * *